(12) United States Patent
Holum

(10) Patent No.: US 6,684,553 B1
(45) Date of Patent: Feb. 3, 2004

(54) FISH RETAINING ASSEMBLY FOR ICE FISHING

(76) Inventor: James K. Holum, 8411 Henna Ave. South, Cottage Grove, MN (US) 55016

( * ) Notice: Subject to any disclaimer, the term of this patent is extended or adjusted under 35 U.S.C. 154(b) by 0 days.

(21) Appl. No.: 10/287,263

(22) Filed: Nov. 4, 2002

(51) Int. Cl.[7] .............................................. A01K 97/01
(52) U.S. Cl. ........................................................ 43/4
(58) Field of Search .................. 43/4, 17, 56; 210/470; 294/53.5

(56) References Cited

U.S. PATENT DOCUMENTS

| | | | | |
|---|---|---|---|---|
| 3,213,561 A | * | 10/1965 | Roemer | 43/17 |
| 3,289,850 A | * | 12/1966 | Gubash | 210/470 |
| 3,722,940 A | * | 3/1973 | Misjak | 43/4 |
| 3,747,253 A | * | 7/1973 | Gangi et al. | 43/4 |
| 3,857,787 A | * | 12/1974 | Kinne | 210/470 |
| 4,218,840 A | * | 8/1980 | Cohee | 43/4 |
| 4,294,030 A | * | 10/1981 | Stewart | 43/4 |
| D269,109 S | * | 5/1983 | Morton | D22/134 |
| 4,747,226 A | * | 5/1988 | Todd | 43/4 |
| 4,769,939 A | * | 9/1988 | Gonska et al. | 43/4 |
| 4,794,718 A | * | 1/1989 | Tillman | 43/4 |
| 4,866,872 A | * | 9/1989 | Guilbault et al. | 43/4 |
| 4,978,156 A | * | 12/1990 | Marhula | 43/4 |
| 5,024,757 A | * | 6/1991 | Malak | 210/470 |
| 5,048,220 A | * | 9/1991 | Harris | 43/4 |
| 5,072,538 A | * | 12/1991 | Hendricks et al. | 43/4 |
| 5,107,614 A | * | 4/1992 | Gonnello | 43/17 |
| 5,140,767 A | * | 8/1992 | Traut | 43/4 |
| 5,218,777 A | * | 6/1993 | Olszowka et al. | 43/4 |
| 5,448,850 A | * | 9/1995 | Gonnello | 43/17 |
| 5,784,824 A | * | 7/1998 | Myroniuk | 43/4 |
| 6,568,120 B2 | * | 5/2003 | Smolinski | 43/4 |
| 6,618,978 B1 | * | 9/2003 | Miranowski | 43/4 |

FOREIGN PATENT DOCUMENTS

| | | | |
|---|---|---|---|
| CA | 2062622 B1 | * | 9/1993 |
| CA | 2146786 B1 | * | 10/1996 |
| CA | 2203939 B1 | * | 10/1998 |
| JP | 2001-161243 B1 | * | 6/2001 |
| SU | 698598 B1 | * | 11/1979 ........ 43/4 |

* cited by examiner

Primary Examiner—Darren W. Ark

(57) ABSTRACT

A fish retaining assembly for ice fishing for containing and retaining a fish being reeled in by an angler. The fish retaining assembly for ice fishing includes an elongate tubular member having open top and bottom ends and a passageway extending therethrough and being adapted to be disposed through a hole in ice and being partially disposed in water; and also includes a support assembly including a belt being fastenable about the elongate tubular member, and also including support members being spacedly and hingedly attached to the belt for resting upon the ice and supporting the elongate tubular member in the hole in the ice; and further includes a trap door assembly including a trap door member being pivotally attached to a bottom of the elongate tubular member and being closable over the open bottom end, and also including a trap door moving member being attached to the trap door member for the opening and closing of the trap door member.

3 Claims, 3 Drawing Sheets

FISH RETAINING ASSEMBLY FOR ICE FISHING

BACKGROUND OF THE INVENTION

1. Field of the Invention

The present invention relates to fish retainers and more particularly pertains to a new fish retaining assembly for ice fishing for containing and retaining a fish being reeled in by an angler.

2. Description of the Prior Art

The use of fish retainers is known in the prior art. More specifically, fish retainers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,866,872; U.S. Pat. No. 5,784,824; U.S. Pat. No. 3,722,940; U.S. Pat. No. 5,140,767; U.S. Pat. No. 5,048,220; and U.S. Des. Pat. No. 269,109.

While these devices fulfill their respective, particular objectives and requirements, the aforementioned patents do not disclose a new fish retaining assembly for ice fishing. The prior art includes tubular members being engaged in holes in the ice and having trap doors for trapping the fish in the tubular members.

SUMMARY OF THE INVENTION

The general purpose of the present invention, which will be described subsequently in greater detail, is to provide a new fish retaining assembly for ice fishing which has many of the advantages of the fish retainers mentioned heretofore and many novel features that result in a new fish retaining assembly for ice fishing which is not anticipated, rendered obvious, suggested, or even implied by any of the prior art fish retainers, either alone or in any combination thereof. The present invention includes an elongate tubular member having open top and bottom ends and a passageway extending therethrough and being adapted to be disposed through a hole in ice and being partially disposed in water; and also includes a support assembly including a belt being fastenable about the elongate tubular member, and also including support members being spacedly and hingedly attached to the belt for resting upon the ice and supporting the elongate tubular member in the hole in the ice; and further includes a trap door assembly including a trap door member being pivotally attached to a bottom of the elongate tubular member and being closable over the open bottom end, and also including a trap door moving member being attached to the trap door member for the opening and closing of the trap door member. None of the prior art includes the combination of the elements of the present invention.

There has thus been outlined, rather broadly, the more important features of the fish retaining assembly for ice fishing in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new fish retaining assembly for ice fishing which has many of the advantages of the fish retainers mentioned heretofore and many novel features that result in a new fish retaining assembly for ice fishing which is not anticipated, rendered obvious, suggested, or even implied by any of the prior art fish retainers, either alone or in any combination thereof.

Still another object of the present invention is to provide a new fish retaining assembly for ice fishing for containing and retaining a fish being reeled in by an angler.

Still yet another object of the present invention is to provide a new fish retaining assembly for ice fishing that is easy and convenient to set up and use.

Even still another object of the present invention is to provide a new fish retaining assembly for ice fishing that prevents the fish from getting loose should the fishing line break as the angler is reeling in the fish.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
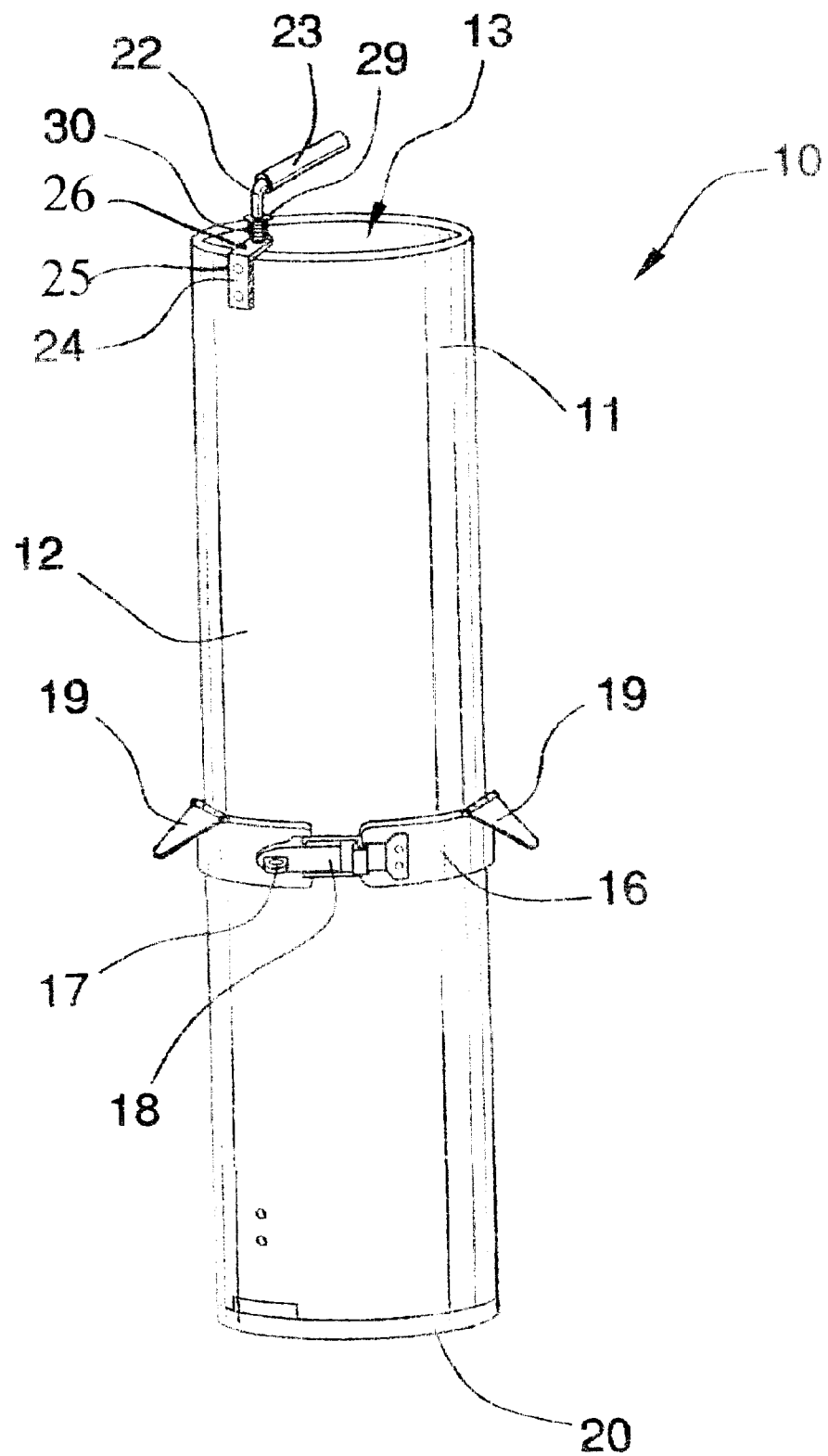
FIG. 1 is a perspective view of a new fish retaining assembly for ice fishing according to the present invention.
Figure 2:
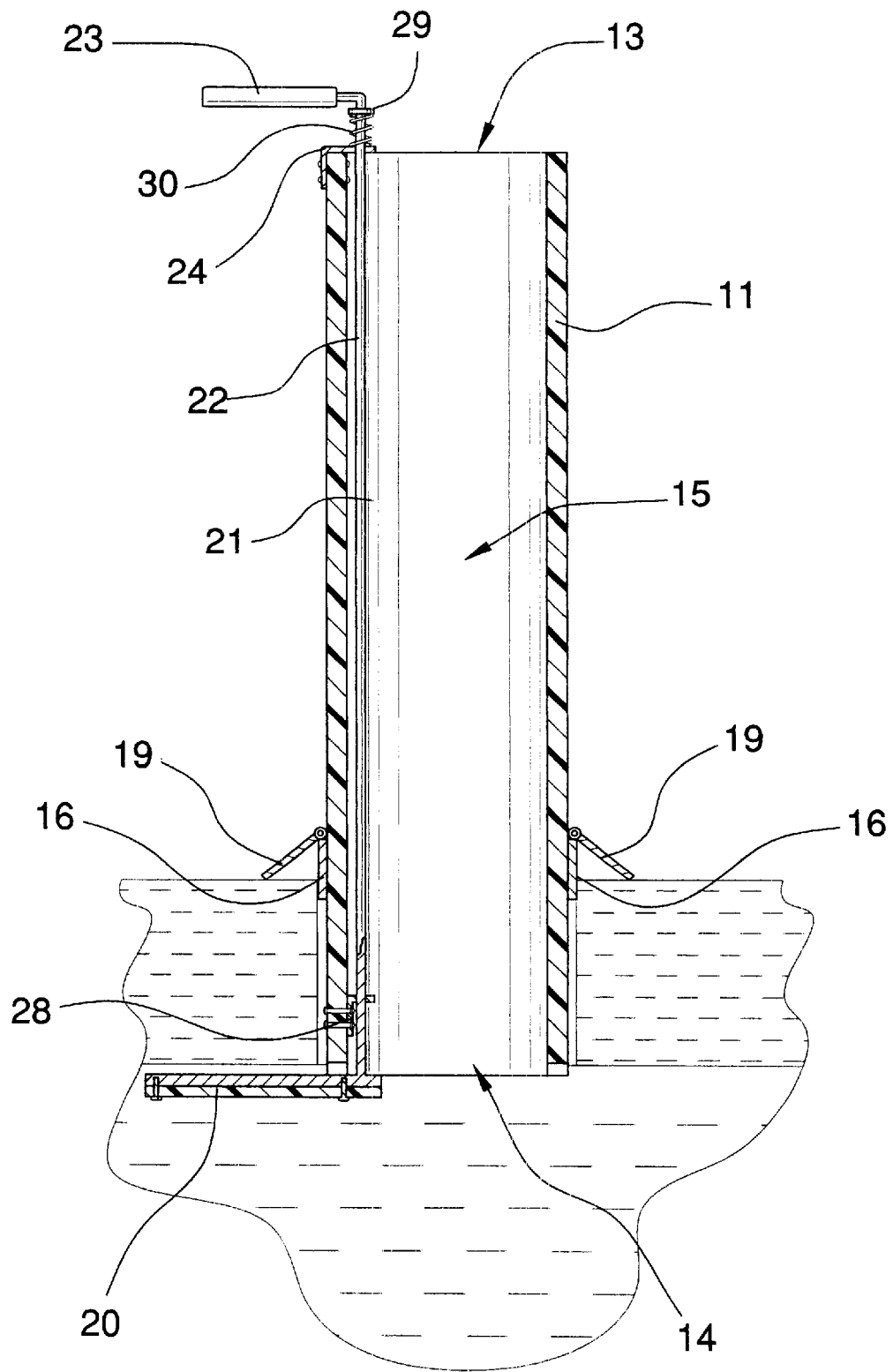
FIG. 2 is a cross-sectional view of the present invention.
Figure 3:
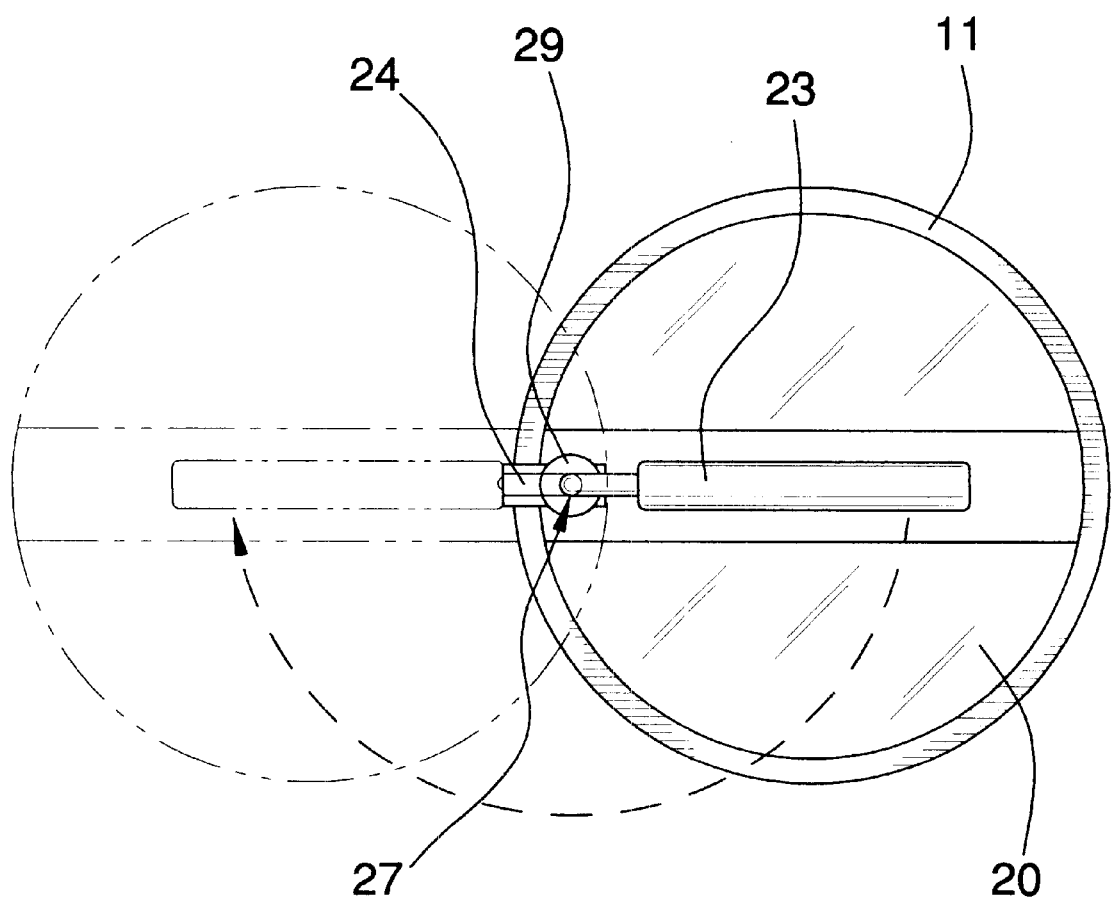
FIG. 3 is a top plan view of the present invention.

With reference now to the drawings, and in particular to FIGS. 1 through 3 thereof, a new fish retaining assembly for ice fishing embodying the principles and concepts of the present invention and generally designated by the reference numeral 10 will be described.

As best illustrated in FIGS. 1 through 3, the fish retaining assembly for ice fishing 10 generally comprises an elongate tubular member 11 having open top and bottom ends 13,14 and a passageway 15 extending therethrough and being adapted to be disposed through a hole in ice with the elongate tubular member 11 being partially disposed in water.

A support assembly including a belt 16 being fastenable about the elongate tubular member 11, and also including support members 19 being spacedly and hingedly attached to the belt 16 for resting upon the ice and supporting the elongate tubular member 11 in the hole in the ice. The support assembly further includes a grommet 17 being conventionally attached to an end of the belt 16, and also includes a buckle 18 being conventionally attached to another end of the belt 16 and being fastenable to the grommet 17 to securely fasten the belt 16 about the elongate tubular member 11. The buckle 18 has a hole being disposed therethrough near an end thereof and removably receiving the grommet 17 therethrough. The support members 19 are generally triangular-shaped tabs each having a base edge being hingedly attached to a longitudinal edge of the belt 16 and each having a rounded vertex which is adapted to rest upon the ice about the hole in the ice.

A trap door assembly includes a trap door member 20 being pivotally and conventionally attached to a bottom of the elongate tubular member 11 and being closable over the open bottom end 14, and also includes a trap door moving member 21 being conventionally attached to the trap door member 20 for the opening and closing of the trap door member 20. The trap door moving member 21 includes a shaft portion 22 being rotatably disposed in the passageway 15 of the elongate tubular member 11, and also includes a handle portion 23 being angled relative to the shaft portion 22 and being pivotally disposed above the open top end 13 of the elongate tubular member 11. The trap door assembly further includes a first bracket 24 being conventionally attached to the side wall 12 at the top end 13 of the elongate tubular member 11, and also includes a second bracket 28 being conventionally attached in the elongate tubular member 11 near the bottom end 14 thereof, and further includes a ring-shaped stopper 29 being conventionally attached about the shaft portion 22 near the handle portion 23 of the trap door moving member 21, and also includes a spring 30 being disposed about the shaft portion 22 between the ring-shaped stopper 30 and the first bracket 24 for biasing the trap door member 20 in the bottom end 14 of the elongate tubular member 11. The shaft portion 22 of the trap door moving member 21 is rotatably and conventionally supported by the first bracket 24 and the second bracket 28. The first bracket 24 includes a first planar portion 25 which is conventionally fastened to the side wall 12 of the elongate tubular member 11, and also includes a second planar portion 26 which is angled relative to the first planar portion 25 and which is disposed in the open top end 13 of the elongate tubular member 11. The second planar portion 26 has a hole 27 being disposed therethrough and through which the shaft portion 22 of the trap door moving member 21 is rotatably disposed.

In use, the user would grasp the handle portion 23 and pivot the trap door member 20 away from the open bottom end 14 of the elongate tubular member 11 so that the user can drop one's fishing line in the water through the passageway 15 of the elongate tubular member 11. Upon hooking a fish, the user would reel the fish into the elongate tubular member 11 through the open bottom end 14 and would grasp the handle portion 23 and pivot the trap door member 20 over the open bottom end 14 of the elongate tubular member 11 with the spring 30 seating the trap door member 20 in the open bottom end 14 to close the elongate tubular member 11 and prevent the fish from escaping.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the fish retaining assembly for ice fishing. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish retaining assembly for ice fishing comprising:

an elongate tubular member having open top and bottom ends and a passageway extending therethrough and being adapted to be disposed through a hole in ice and being partially disposed in water;

a support assembly including a belt being fastenable about said elongate tubular member, and also including support members spacedly and hingedly attached to said belt for resting upon the ice and supporting said elongate tubular member in the hole in the ice, said support assembly further including a grommet being attached to an end of said belt, and also including a buckle being attached to another end of said belt and being fastenable to said grommet to securely fasten said belt about said elongate tubular member, said buckle having a hole being disposed therethrough near an end thereof and removably receiving said grommet therethrough, said support members being generally triangular-shaped tabs each having a base edge being hingedly attached to a longitudinal edge of said belt and each having a rounded vertex which is adapted to rest upon the ice about the hole in the ice, and a trap door assembly including a trap door member being pivotally attached to a bottom of said elongate tubular member and being closable over said open bottom end, and also including a trap door moving member being attached to said trap door member for the opening and closing of said trap door member, said trap door moving member including a shaft portion being rotatable disposed in said passageway of said elongate tubular member, and also including a handle portion being angled relative to said shaft portion and being pivotally disposed above said open top end of said elongate tubular member, said trap door assembly further including a first bracket being attached to a side wall of said elongate tubular member at said top end of said elongate tubular member, said shaft portion of said trap door moving member being rotatable supported by said first bracket, said trap door assembly also including a second bracket being attached in said elongate tubular member near said bottom end thereof, and further including a ring-shaped stopper being attached about said shaft portion near said handle portion of said trap door moving member, and also including a spring being disposed about said shaft portion between said ring-shaped stopper and said first bracket for biasing said trap door member in said bottom end of said elongate tubular member.

2. A fish retaining assembly for ice fishing as described in claim 1, wherein said first bracket includes a first planar portion which is fastened to said side wall of said elongate tubular member, and also includes a second planar portion which is angled relative to said first planar portion and which is disposed in said open top end of said elongate tubular member.

3. A fish retaining assembly for ice fishing as described in claim 2, wherein said second planar portion has a hole being disposed therethrough and through which said shaft portion of said trap door moving member is rotatably disposed.

* * * * *